US007010295B1

(12) United States Patent
Zerlan et al.

(10) Patent No.: US 7,010,295 B1
(45) Date of Patent: Mar. 7, 2006

(54) METHOD AND SYSTEM FOR AUTOMATIC TESTING OF NETWORK ELEMENTS

(75) Inventors: Joshua Ryan Zerlan, Gardner, KS (US); Wei Kao, Lawrence, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 561 days.

(21) Appl. No.: 09/842,550

(22) Filed: Apr. 25, 2001

(51) Int. Cl.
*H04Q 7/20* (2006.01)

(52) U.S. Cl. .................. 455/424; 455/67.14; 455/423; 455/67.11; 455/425; 375/224; 379/29.01

(58) Field of Classification Search ........ 455/423–425, 455/67.14, 67.11; 379/22.01, 22.02, 27.02, 379/27.03, 29.01, 1.01; 375/224
See application file for complete search history.

(56) References Cited

U.S. PATENT DOCUMENTS 4,022,979 A 5/1977 Smith
4,430,530 A 2/1984 Kandell et al.
4,977,399 A * 12/1990 Price et al. ................ 340/7.21
5,060,226 A 10/1991 Gewin et al.
5,095,500 A * 3/1992 Tayloe et al. ............ 379/32.01
5,289,526 A * 2/1994 Chymyck et al. ........... 455/424
5,425,076 A * 6/1995 Knippelmier ............ 379/27.04
5,469,494 A * 11/1995 Ortiz Perez et al. ..... 379/27.01
5,619,550 A * 4/1997 Averbuch et al. ........ 379/29.08
5,764,726 A * 6/1998 Selig et al. ................... 379/21
5,875,398 A * 2/1999 Snapp ........................ 455/424
5,913,162 A * 6/1999 Gourdin et al. ............. 455/424
5,930,707 A * 7/1999 Vambaris et al. ........... 455/424
5,943,617 A * 8/1999 Nakamura .................. 455/423
5,949,773 A 9/1999 Bhalla et al.
5,953,647 A 9/1999 Patel et al.
5,987,320 A * 11/1999 Bobick ....................... 455/423
6,057,943 A 5/2000 Kweon et al.

(Continued)

OTHER PUBLICATIONS

Test Equipment System—M II, Multi Call Generator, Feb. 1, 2001, pp. 1-3.
NeoPoint, Inc., Engineering Services Measurements Products, PORTABLE MCS, Feb. 1, 2001, pp. 1-3.

(Continued)

*Primary Examiner*—George Eng
*Assistant Examiner*—Sharad Rampuria

(57) ABSTRACT

A method and system for the testing of multiple elements in a communications network. The method may include using a test host that has both control and data input/output capabilities. The test host may send a signal over the network via one communication device, such as a mobile station, that is connected to and controlled by the test host. A resulting signal may then be received at the communication device or at a second communication device, which may be another mobile station, that is connected to and controlled by the test host. A comparison of the signal sent into the network with the signal received from the network may be used to verify proper operation of any elements in the network.

22 Claims, 4 Drawing Sheets

U.S. PATENT DOCUMENTS

| | | | | |
|---|---|---|---|---|
| 6,185,419 | B1 * | 2/2001 | Sasin et al. | 455/423 |
| 6,199,032 | B1 * | 3/2001 | Anderson | 703/21 |
| 6,219,543 | B1 * | 4/2001 | Myers et al. | 455/423 |
| 6,272,337 | B1 * | 8/2001 | Mount et al. | 455/423 |
| 6,285,876 | B1 * | 9/2001 | Zhong | 455/424 |
| 6,430,420 | B1 * | 8/2002 | Johnson et al. | 455/561 |
| 6,625,448 | B1 * | 9/2003 | Stern | 455/425 |
| 6,687,499 | B1 * | 2/2004 | Numminen et al. | 455/423 |
| 6,813,477 | B1 * | 11/2004 | Harris et al. | 455/67.14 |
| 6,836,547 | B1 * | 12/2004 | Tahernezhaadi | 379/406.01 |

OTHER PUBLICATIONS

NeoPoint, Inc., Engineering Services Measurements Products, PROACT PLUS VERSION 1.0, Feb. 1, 2001, pp. 1-3.

NeoPoint, Inc., Engineering Services Measurements Products, DATALOGGER™ VERSION 2.0, Feb. 1, 2001.

NeoPoint, Inc., Engineering Services Measurements Products, Measurement Products, Feb. 1, 2001, p. 1.

* cited by examiner

METHOD AND SYSTEM FOR AUTOMATIC TESTING OF NETWORK ELEMENTS

BACKGROUND OF THE INVENTION

1. Field of the Invention

The present invention relates to communications networks, and more specifically, to a method and system for testing elements in communications networks.

2. Description of Related Art

By loading new software in network elements, it is easy and convenient to modify software-based network elements (or other network elements) to improve their performance, add features, or correct problems. Such comprehensive software updates are referred to as platform software loads. As elements of networks are modified by new platform software loads, consistent, efficient testing of the networks and the modified elements within the networks becomes more difficult. For example, if a seemingly simple hardware or software change is made to a network element, the network may continue to function normally for one type of call, like a circuit-switched voice call. The change, however, may create problems or failures for data transfers over the network, such as fax calls, asynchronous data transfers, mobile-to-mobile fax calls, mobile-to-land fax calls, mobile-to-land data calls, etc.

Thus, it may be useful, when testing a network that has a modified element or elements, to send data of various kinds over the network to ensure complete functional compatibility (i.e., interoperability), between the modified element and various communications devices that may be used on the network.

One way to ensure such interoperability is regression testing. Regression testing of a network element may be accomplished by sending data over the network (and through the network element under test) from a transmitting communication device to a receiving communication device and then comparing the sent data to the received data. As an example, a regression test may be performed by sending data over the network from a mobile station acting as a cellular modem and receiving the data in a receiving communication device, such as a modem, and determining if any errors occurred in the transmission.

In an ideal data regression test of a network element (for example, an InterWorking Function, or IWF), rigid consistency and repeatability would be preferable to ensure that the test procedure itself does not introduce errors in the data transfer. Alternatively, by replacing the element under test with the element it replaced (or by restoring the element's software to its previous version) and running the same regression test again, test consistency and repeatability may be used to determine whether any problems that do occur during a data transfer are due to the network element under test or due to some other part of the system. Achieving such consistency and repeatability during data network regression testing may be very difficult or impossible with manual execution of test procedures. Further, manual testing consumes engineering and lab resources during times of high demand. Therefore, a test procedure that is more consistent, time efficient, and repeatable is desired.

SUMMARY OF THE INVENTION

A method of testing various elements of a communications network is provided. In an exemplary embodiment, the method may include the steps of using a test host to cause a first communication device to send a test signal into a network, and then receiving, in the test host via the first or a second communication device, another test signal from the network. To complete the test, the test host may perform a comparison between the original test signal and the received test signal and provide an output indicative of a result of the comparison, by which the interoperability of the network entity and the communications devices may be determined.

In another embodiment of the invention, the method may include using a test host to cause an actual (i.e., non-simulated) mobile station, such as a wireless telephone or PDA, to send a set of test data into a communications channel that includes a network entity. Next, the test host may receive a second set of test data from the communications channel via the mobile station or a second communication device, which may also be a non-simulated mobile station, such as a wireless telephone or PDA. The test host may then perform a comparison between the first set of test data and the second set of test data and provide an output indicative of a result of the comparison, by which the interoperability of the network entity and the communications devices may be determined. If, for example, the fist set of test data is a digital file, the second set of test data may be a digital file that is substantially the same as the first set. In other words, the data contained in the two files may be bit-for-bit identical. The comparison performed in this case would be a bit-for-bit comparison of the two files, where the test host may flag any unreported errors.

BRIEF DESCRIPTION OF THE DRAWINGS

Exemplary embodiments of the present invention are described herein with reference to the drawings, in which.

DETAILED DESCRIPTION OF AN EXEMPLARY EMBODIMENT

1. Exemplary Architecture

Figure 1:
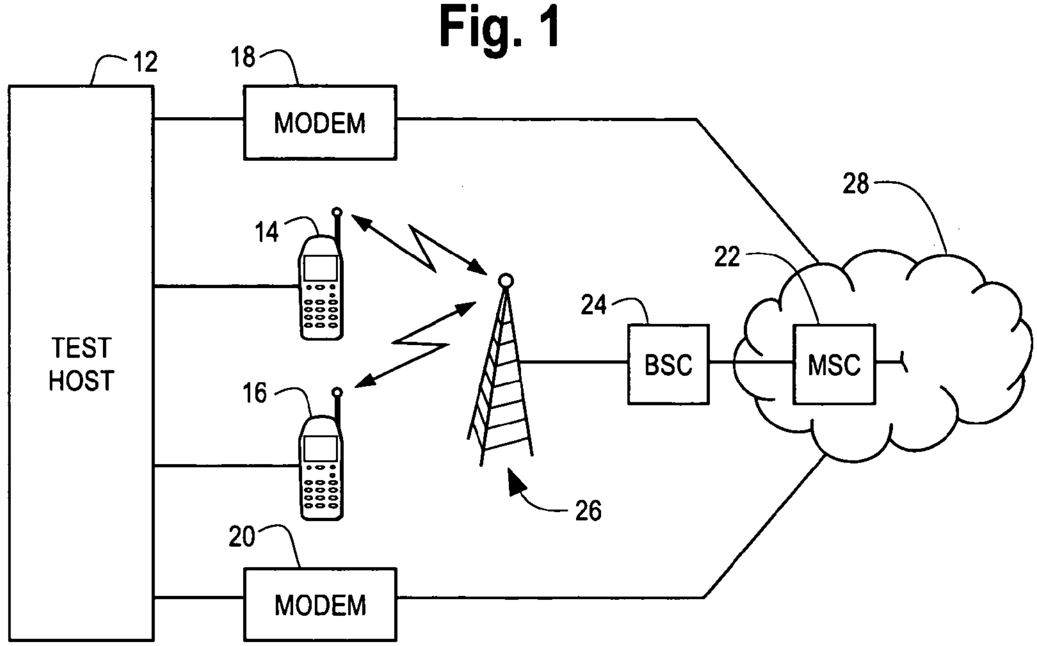
FIG. 1 is a simplified block diagram that illustrates a telecommunications network in which an exemplary embodiment of the present invention can be implemented.

Referring to the drawings, FIG. 1 illustrates a simplified diagram of a system 10 in which an exemplary embodiment of the present invention may be employed. As shown in FIG. 1, system 10 may include multiple communication devices, such as (without limitation) landline sending modem 18 and receiving modem 20, and mobile stations such as sending mobile station 14 and receiving mobile station 16, interconnected to a network 28. Communication devices 14, 16, 18, and 20 may be both communicatively coupled and under the control of a computer such as test host 12.

Network 28 may include the public switched telephone network (PSTN) or another network used for the testing of modified network elements. Network 28 may include one or more network elements that are to be tested by the method and system of the exemplary embodiment.

Mobile stations 14 and 16 may be part of a code division multiple access (CDMA) cellular communication system, as set forth in TIA IS-95A. Mobile stations 14 and 16 may be communicatively coupled to network 28 through a mobile switching center (MSC) 22, such as a Telcordia MSC, a base station controller (BSC) 24, and a base transceiver station (BTS) 26. Although mobile stations 14 and 16 are shown as wireless telephones, they may take any suitable form, such as (without limitation) wireless personal digital assistants (PDAs) or wireless modems. Further, mobile station 14 may be a different type of device than mobile station 16.

Figure 2:
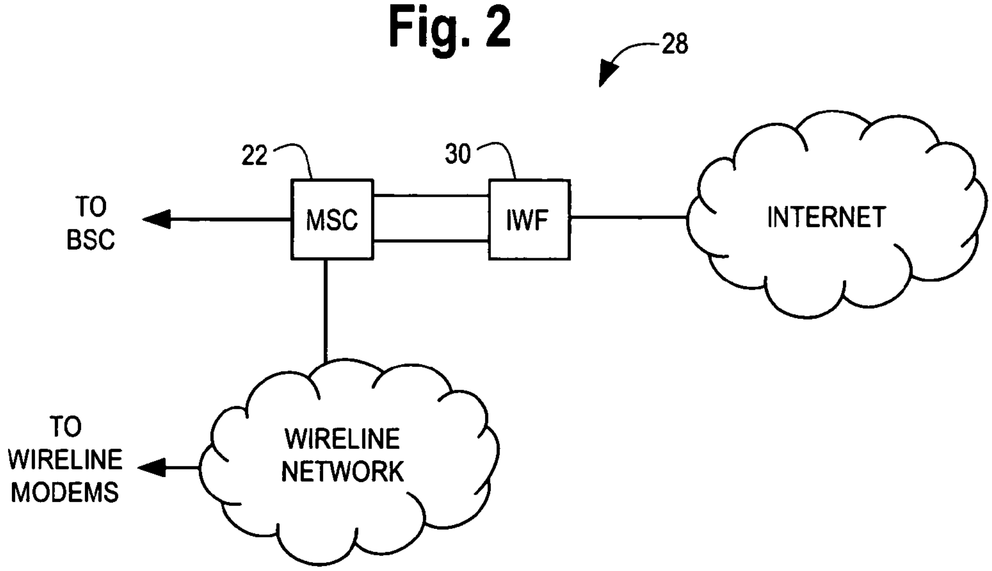
FIG. 2 is a simplified block diagram that illustrates in greater detail a portion of a telecommunications network in which an exemplary embodiment of the present invention can be implemented.

As shown in FIG. 2, an IWF 30 may be connected to MSC 22. An IWF acts as a gateway between wireless CDMA networks and circuit-switched or packet-switched networks, such as the PSTN or the Internet. An IWF or its equivalent is sometimes necessary to perform interworking and protocol conversions that give CDMA cellular users circuit-switched data capabilities (i.e., the data capabilities typically accessed through land-line modems) such as e-mail access, Internet access, and fax services. For circuit-switched data conversion, the IWF may be implemented as a pool of modems typically connected to an MSC via an A2 link as described in TIA/EIA IS-634.

Figure 3:
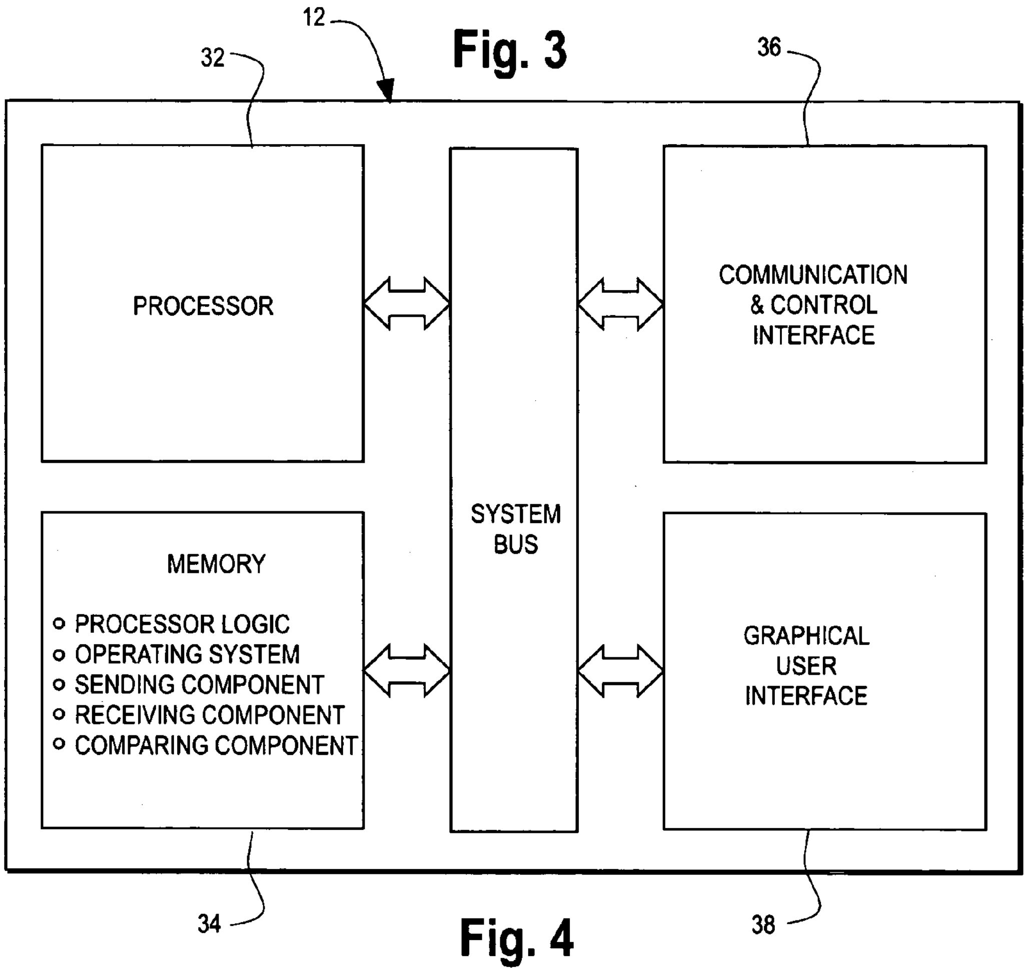
FIG. 3 is a simplified block diagram illustrating a test host which may be used in conjunction with an exemplary embodiment of the present invention.

FIG. 3 illustrates a simplified block diagram of an exemplary embodiment of test host 12. Test host 12 may be any computer with sufficient hardware to support multiple serial ports, such as an IBM-compatible personal computer running the Linux operating system or any other suitable operating system. Test host 12, by way of example, may include a processor 32 (e.g., an integrated circuit microprocessor), a memory 34 (e.g., ROM, flash memory, non-volatile memory, hard disk, etc.), a graphical user interface 38, and a communication and control interface 36, all of which may be interconnected by a system bus. This particular configuration is not crucial to the functioning of the present invention. For example, the present invention could be implemented by a device without a system bus and having a memory and a processor contained in one integrated circuit. Further, those skilled in the art will appreciate that many of the elements described in this exemplary embodiment are functional entities that may be implemented as discrete components or in conjunction with other components, in any suitable combination and location.

Memory 34 may include more than one physical element, and may also include: an operating system for processor 32; a sending component comprised of a set of stored logic by which processor 32 may send a test signal into network 28 via mobile station 14; a receiving component comprised of a set of stored logic by which processor 32 may receive a test signal from network 28 via mobile station 16; and a comparing component comprised of a set of stored logic by which processor 32 may compare one test signal, such as a set of data, to another test signal. Provided with the present disclosure, those skilled in the art can readily prepare appropriate computer instructions to perform such functions.

Graphical user interface 38 may include an input keyboard and a display. The keypad may be used to cause test host 12 to initiate a test case or various combinations of test cases, such as sending different formats of data files into network 28. The display may be used to display the results of a test or tests. It should be noted that a keypad and display are not crucial to the functioning of the present invention, and that any technology may be used to implement graphical user interface 38. For example, a touch screen could take the place of a keypad and an audible signal could take the place of a display.

Communication and control interface 36 may be comprised of a conventional serial board such as Equinox Systems' SuperSerial I/O adapter (not shown) and may be used as the computer's interface to landline modems 18 and 20 and mobile stations 14 and 16 acting as cellular modems as shown in FIG. 1.

An object of the exemplary embodiment is to perform closed-loop testing of a network element (or elements) such as an IWF, using communications devices such as mobile stations. While the exemplary embodiment may be implemented using any combination of wireless and landline terminals (such as landline modems 18 and 20) and more than one type of communication, such as voice or data, this description will focus on the operation of the method using mobile station 14 and mobile station 16 to send and receive data calls, respectively.

Under the control of test host 12, a data call may be initiated at mobile station 14, be connected to network 28 as described above, and finally be received at mobile station 16. While this description focuses on a data call between only two mobile stations connected to test host 12, it should be understood that test host 12, as well as the other elements of the exemplary embodiment, can easily support simultaneous network tests using multiple communications channels. It should also be understood that the functions performed by test host 12 may be carried out by one or more computers or other appropriate devices operating in concert.

During network testing, it is preferred, where possible, to use the same equipment that customers use to access the network, such as mobile stations and other communications devices. Thus, to ensure that testing occurs under real-world conditions, test host 12 may be configured to control actual mobile stations connected to the network as shown in the exemplary embodiment. Network testing could be implemented using a test host and simulated mobile stations (e.g., a computer module configured to drive a stand-alone RF device) to perform data transfers when testing network elements. Conducting a data transfer test without using actual mobile stations, however, may mask any network interface problems that could occur later when a customer uses the system with a mobile station. Thus, it would also be advantageous to include mobile stations as part of an automatic test system that could be run at night or any time, to produce realistic, consistent test results and better utilize lab and engineering resources.

According to the exemplary embodiment of the present invention, an element of a circuit-switched or packet-switched data network may be regression tested by using a test host to cause a mobile station to perform the same steps a user would perform to effect a wireless data transfer. The data transfer may be of any type, but would typically be either a class 2 fax call (TIFF format), an asynchronous data (AD) call, or a Quick Net Connect (QNC) single-stack or double-stack call. The type of test or tests run during a session may be specified by a user of the system.

Test host 12 may be used to control both the transmitting and receiving communication devices and to process the test results. To test a network element, such as IWF 30, a data transfer call may be set up to transfer data over a known network between the transmitting device and the receiving device. Thus, any individual network element within the known data path may be regression tested under the control of test host 12. The network element under test may reside either in a public network, a test lab's network, or any other network. Test calls may include mobile originated, mobile terminated, and mobile-to-mobile calls as well as landline calls.

By way of example, for a mobile originated, mobile terminated fax call, an exemplary test host may control the transmitting and receiving mobile stations in a way that simulates user action. To do this, it may be advantageous (though not strictly necessary) to use mobile stations that are programmed to receive commands and to act on them through their application programming interfaces (APIs). Using mobile stations that can be controlled through their APIs (for example, Denso Eagle 10 or Eagle 12 wireless phones), test host 12 may send a command to dial digits, execute a "send" command, or recognize and respond to a ring signal, and the mobile stations will respond as if a user had pressed buttons to accomplish these functions.

Test host 12 can perform other functions in addition to sending and receiving data via communications devices. Some of the fax modem functions tested for a CDMA analog fax call under the control of test host 12, for example, might include modem initialization, answering, dialing, protocol handshaking, and call termination.

2. Exemplary Operation

FIG. 3 generally illustrates a set of functions that may be involved in an exemplary embodiment of the present invention. In this embodiment, test host 12 may be used to perform a regression test by sending a test signal into network 28 and receiving a second test signal from network 28. Test host 12 can then verify that the elements and links that make up network 28 or even system 10 are operating properly by determining if the second test signal was the expected result of sending the first test signal into network 28 or system 10.

First, at block 40, test host 12 may cause a first communication device, such as mobile station 14, to send a first test signal into network 28. This first test signal may be a DTMF tone or tones that represents dialed digits, a digital data file such as a TIFF formatted file, or virtually any signal capable of being sent through network 28. As shown at block 42, a second communication device, such as mobile station 16, can receive a test signal from network 28, the test signal (or an indication of it) in turn being received at test host 12. The received test signal may be a ring signal that results from the dialed digits from mobile station 14. It may also be a digital data file, such as a TIFF formatted file. Finally, the received test signal may be virtually any signal capable of being received from network 28. If there is no problem with network 28, the received test signal, such as a TIFF file, may be the same as a file sent through network 28, so that a comparison of the received file to the sent file may indicate the quality of network 28.

To verify that one or more elements that make up network 28 or even system 10 are operating properly, test host 12 can perform a verification of the results of sending the first test signal into network 28, as depicted at block 44. This verification may be a one-to-one comparison of each bit of the digital data of the first test signal to the digital data of the second test signal, if a data file was transferred at blocks 40 and 42. Alternatively, step 44 may simply be a verification that a communications channel was successfully established. For example, test host 12 may cause mobile station 14 to dial digits and execute a "send" command and then verify that mobile station 16 received a ring signal in response to the call.

The results of this regression test can be displayed on graphical user interface 38, in comprehensive form or simplified form, as shown at block 46. The regression test may typically be done before any modification to network 28 to establish a performance baseline. The regression test may then be repeated after network 28 has been modified in some way; after replacing a network element or upgrading it through a platform software load, for example. If the test results in any errors, a user may replace the modified network element (or return it to its pre-test condition) and run the test again to determine whether the error was caused by the modified network element or by something else.

Figure 5:
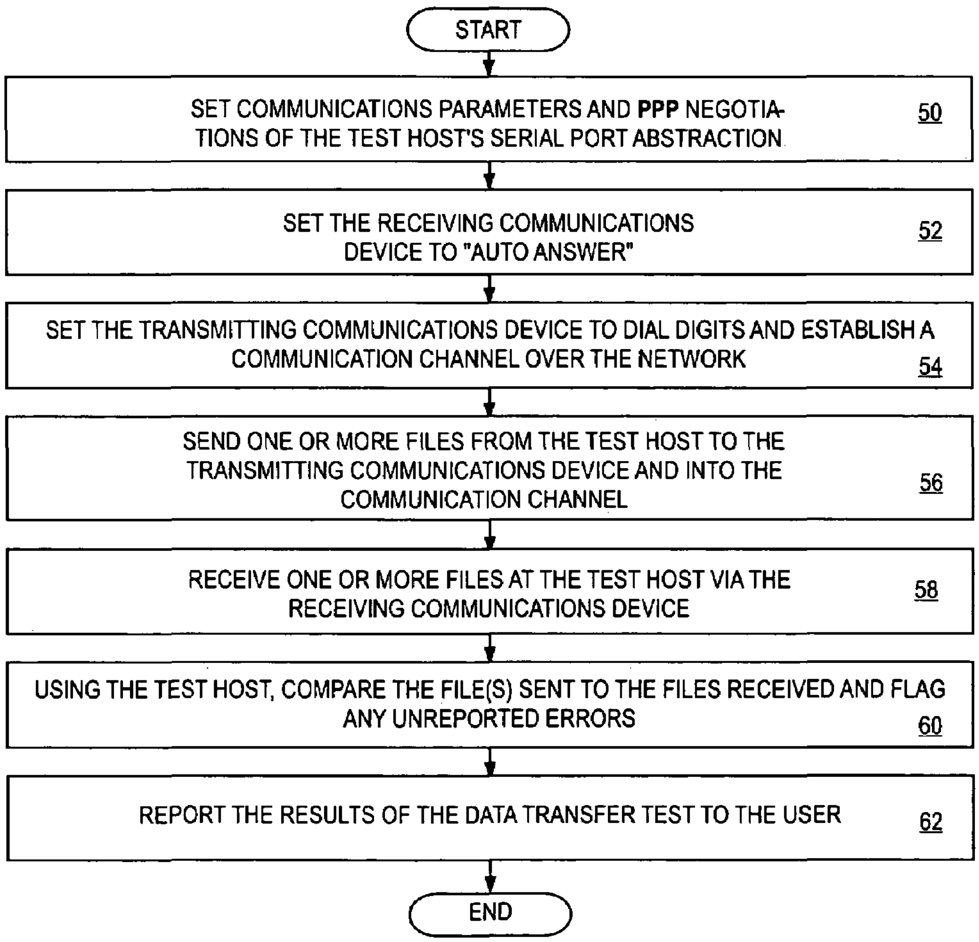
FIG. 5 is a flow chart illustrating the operation of an alternative exemplary embodiment of the present invention.
Figure 6:
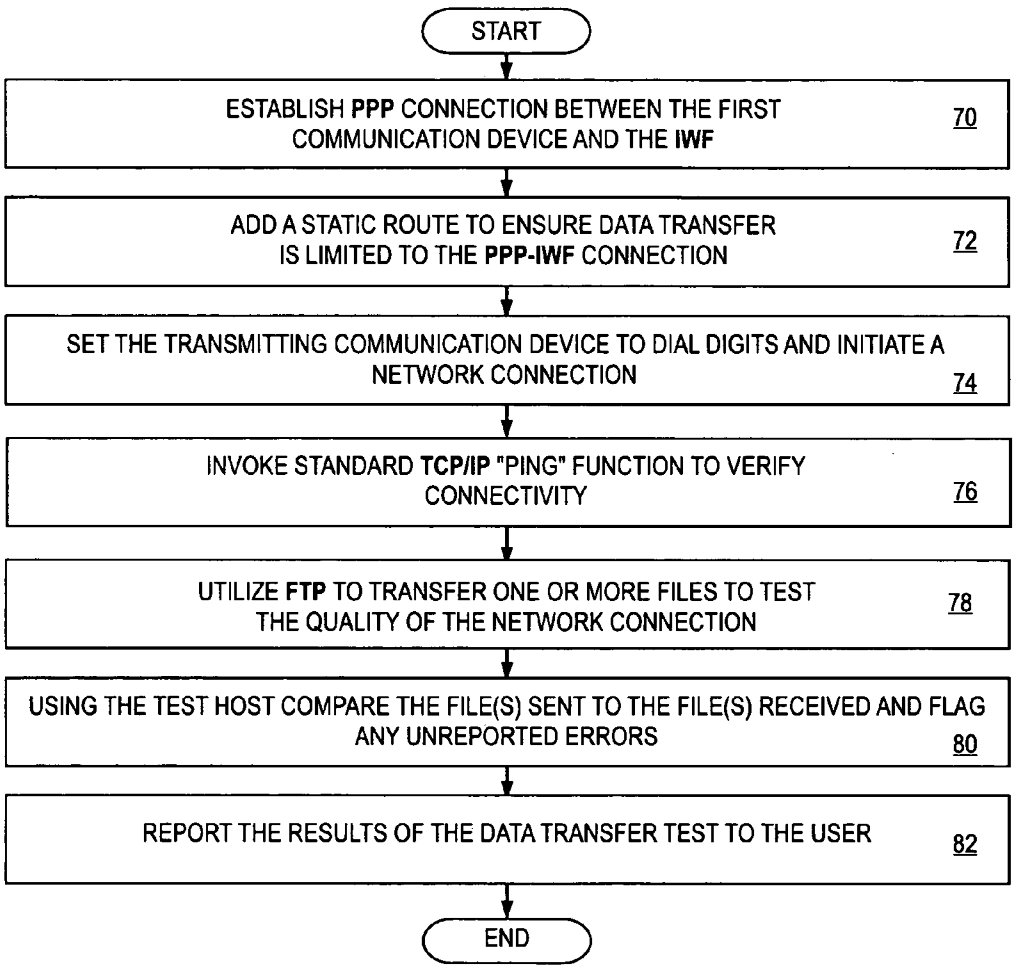
FIG. 6 is a flow chart illustrating the operation of another alternative exemplary embodiment of the present invention.

FIG. 5 illustrates a more specific embodiment of the present invention, where the method is used to test a CDMA analog fax call made through network 28 via mobile stations 14 and 16 and system 10. At block 50, test host 12 sets communications parameters and PPP negotiations on its serial port abstraction to establish a PPP connection and TCP connection with IWF 30, in order to acquire a modem in IWF 30 and make a fax call. Next, test host 12 may cause mobile station 16, acting as a cellular modem, to "auto answer" an anticipated fax call by sending an "ATS0=1" command to mobile station 16 (block 52).

Once the TCP connection is established with IWF 30, test host 12 may send a configuration command (AT+CFG) and then a dial command (ATD) and the desired dial string to the acquired modem in IWF 30 via mobile station 14. Mobile station 14 may then send a fax call origination message (encapsulated in the PPP and TCP protocols) to IWF 30, and IWF 30 may set up a fax connection. As depicted at block 54, this completes the process of establishing a communications channel between mobile stations 14 and 16 that originates at test host 12 and also terminates at test host 12 via system 10 and network 28, as shown in FIG. 1. The communications channel includes IWF 30.

Figure 4:
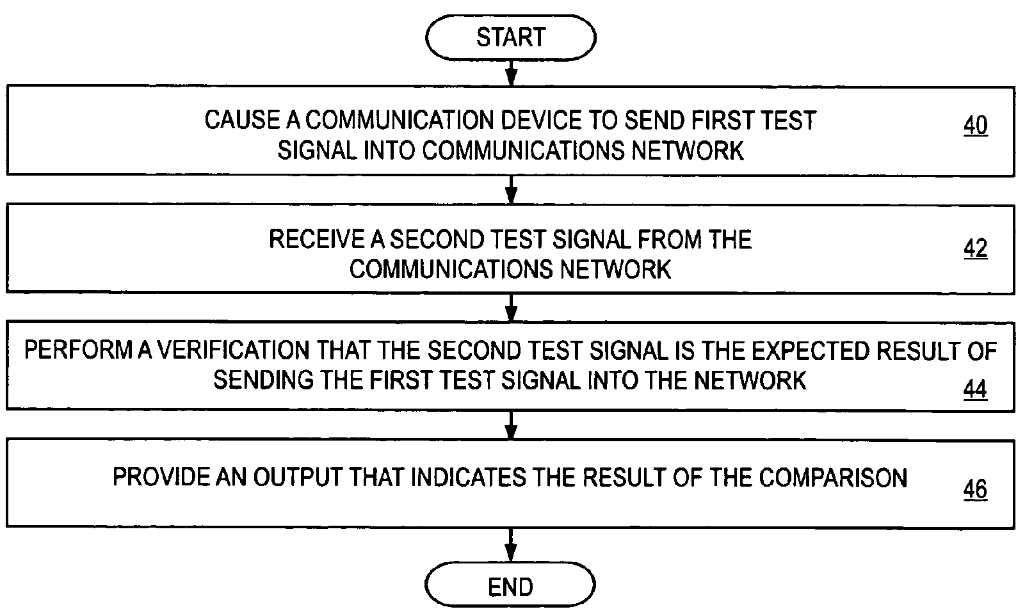
FIG. 4 is a flow chart illustrating the operation of an exemplary embodiment the present invention.

In addition to simulating user commands and establishing a data communications connection over system 10 and network 28, test host 12 may provide mobile station 14 with data input that simulates a user sending (or, for that matter, receiving) a cellular fax via a laptop computer or a cellular fax machine coupled to mobile station 14 acting as a cellular modem. Thus, as shown in FIG. 4 at block 56, test host 12 may cause mobile station 14 to send one or more TIFF files into network 28. Alternatively, test host 12 may cause mobile station 14 to send one or more data files through network 28 using the Zmodem file transfer protocol, as is well known to those of ordinary skill in the art. Using the Zmodem protocol, it is possible to encounter errors, have them reported, and transparently continue with the transmission via the detect and retry strategy.

The test host may then receive the file or files via network 28 and mobile station 16, as shown at 58. Thus, where digital data files are used as test signals, a test case with no errors means that the data file received by mobile station 16 will be substantially the same as the data file sent into network 28 from mobile station 14. To verify this, test host 12 can compare the file received to the file that was sent, as shown at block 60. As shown at block 62, test host 12 can report, via a graphical user interface or a simple text output, any results generated by the data transfer test, as described in more detail below.

The comparison of the first test signal to the second test signal may indicate whether a platform software load (or other change) in a network element such as IWF 30 has created a problem or a failure that could affect customers sending data over a network. Test host 12 may be configured to capture the simple text output stream generated as a result of a test case. These simple results may include a listing of the tests performed, the time that each test was performed, and an indication of success or failure of each test, as shown at block 46. The text output may also be used to display, via a graphic interface, comprehensive test results that may include the time each test began, test duration, the mobile identification numbers (MINs) of any mobile stations used in the test, files transferred, wireline modems and serial interfaces used, pass/fail results for each test, and total pass/fail statistics. The graphic interface may also be configured to give a user the ability to display only passed or only failed tests.

The test procedure may be somewhat similar for the other types of data transfers mentioned and for wireline-terminated and wireline-to-wireline calls. When QNC calls are used to test the network, no separate modem is required on the wireless end of the data transmission. Also, with QNC calls, the data may be sent directly into the internet via the IWF without first being routed through the PSTN. The data may then be received at the second communications device either through a direct internet connection or back through the PSTN, depending on how the call is routed.

Some functional steps that may be used for QNC calls are illustrated in FIG. 5. At block 70, test host 12 may cause mobile station 14 to establish a PPP session with IWF 30. After the PPP session is established, a static route may be added to insure the subsequent TCP/IP session will occur via the mobile data path rather than the Ethernet LAN connection within IWF 30 (block 72). As in the previous example, test host 12 can cause mobile station 14 to dial digits and establish a direct IP or layer 2 tunneling connection to a file server (not shown) over network 28, as shown at block 74. At block 76, test host 12 may invoke a standard TCP/IP "ping" function to verify connectivity between mobile station 14 and the file server. If no connectivity has been established, the ping will time out and the error will be logged by test host 12.

Next, FTP may be used to send one or more files into network 28 to test the quality of the network connection (block 78). Once a file is sent to a file server on network 28, test host 12 may request that the server send it back via an FTP "get" command. The file will then return to test host 12 via mobile station 14, where it may be compared to the file originally sent (block 80). The results of the test may be reported to the user as shown at block 82 and described in detail above.

Exemplary embodiments of the present invention have been illustrated and described. It will be understood, however, that changes and modifications may be made to the invention without deviating from the spirit and scope of the invention, as defined by the following claims.

We claim:

1. A method of automatically testing a communications system, comprising, in combination:

(a) using a test host to cause a first communication device to send a first test signal into a communications channel;

(b) receiving a second test signal in the test host from the communications channel via a second communication device;

(c) the test host performing a comparison between the first test signal and the second test signal; and (d) the test host displaying a result of the comparison.

2. The method of claim 1, wherein the first test signal is the same as the second test signal.

3. The method of claim 2, wherein the first test signal comprises a digital data file.

4. The method of claim 2, wherein the digital data file is a TIFF file.

5. The method of claim 1, wherein the communications channel comprises a network element, the method further comprising:

after performing method steps (a) through (d), modifying the network element and then repeating steps (a) through (d).

6. The method of claim 1, wherein the first test signal represents dialed digits and the second test signal comprises a ring signal.

7. The method of claim 1, wherein the first communication device comprises a mobile station.

8. The method of claim 1, wherein each of the first communication device and second communication device is selected from the group consisting of (i) a mobile station, and (ii) a landline modem.

9. The method of claim 1, wherein at least the first communication device comprises a non-simulated mobile station.

10. The method of claim 1, wherein the first communication device and the second communication device are non-simulated mobile stations.

11. The method of claim 1, wherein the test host comprises a computer.

12. A method of automatically testing a communications system, comprising, in combination:

(a) using a test host to cause a first non-simulated wireless subscriber terminal to send a first set of data into a communications channel, the communications channel including a network element;

(b) receiving a second set of data in the test host from the communications channel via a second non-simulated wireless subscriber terminal;

(c) the test host performing a comparison between the first set of data and the second set of data; and (d) the test host providing an output indicative of a result of the comparison.

13. A system for testing an element of a network, comprising:

a first communication device that sends a first test signal into the network;

a second communication device that receives a second test signal from the network; and a test host communicatively coupled to the first communication device and the second communication device, the test host including:

(a) a sending component that causes the first communication device to send the first test signal into the network;

(b) a receiving component that receives the second test signal from the second communication device;

(c) a comparing component that makes a comparison of the first test signal to the second test signal; and (d) a display that indicates a result of the comparison.

14. The system of claim 13, wherein the first test signal represents dialed digits and the second test signal represents a ring signal.

15. The system of claim 13, wherein the first communication device comprises a wireless subscriber terminal.

16. The system of claim 13, wherein each of the first communication device and second communication device is selected from the group consisting of (i) a wireless subscriber terminal, and (ii) a landline subscriber terminal.

17. The system of claim 13, wherein each of the first communication device and second communication device is selected from the group consisting of (i) a wireless sub scriber terminal, (ii) a landline subscriber terminal, (iii) a fax machine, and (iv) a modem.

18. The system of claim 13, wherein each of the first communication device and second communication device is selected from the group consisting of (i) a non-simulated communication device, and (ii) a simulated communication device.

19. The system of claim 13, wherein the first communication device and the second communication device are non-simulated communication devices.

20. The system of claim 13, wherein the first communication device and the second communication device are non-simulated wireless subscriber terminals.

21. The system of claim 13, wherein the first test signal is the same as the second test signal.

22. The system of claim 13, wherein the test host comprises a memory and a processor, and the sending component, the receiving component, and the comparing component each comprise a set of instructions stored in a memory, the set of instructions executable by the processor.

* * * * *